United States Patent
Malik (10) Patent No.: US 7,321,921 B2
(45) Date of Patent: Jan. 22, 2008

(54) MESSAGING SYSTEM IN A HYBRID NETWORK AND MOBILE COMMUNICATION ENVIRONMENT

(75) Inventor: Dale W. Malik, Dunwoody, GA (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 52 days.

(21) Appl. No.: 10/889,859

(22) Filed: Jul. 13, 2004

(65) Prior Publication Data
US 2006/0014525 A1 Jan. 19, 2006

(51) Int. Cl.
G06F 15/16 (2006.01)
H04Q 7/20 (2006.01)

(52) U.S. Cl. ................... 709/206; 455/466

(58) Field of Classification Search ............. 455/403, 455/414.1, 414.4, 466, 412.1; 379/90.01, 379/93.01, 106.01; 709/204–206
See application file for complete search history.

(56) References Cited

U.S. PATENT DOCUMENTS

| | | | | |
|---|---|---|---|---|
| 5,675,733 | A * | 10/1997 | Williams | 709/206 |
| 6,151,507 | A | 11/2000 | Laiho et al. | 455/466 |
| 6,658,095 | B1 * | 12/2003 | Yoakum et al. | 379/93.01 |
| 7,043,530 | B2 | 5/2006 | Isaacs et al. | 709/206 |
| 2002/0035605 | A1 * | 3/2002 | McDowell et al. | 709/206 |
| 2004/0171396 | A1 * | 9/2004 | Carey et al. | 455/466 |

OTHER PUBLICATIONS

Harry Newton, Newton's Telecom Dictionary (Definition of "ACK"), Mar. 2004, CMP Books, 20th Edition, p. 42.*

* cited by examiner

*Primary Examiner*—Rafael Perez-Gutierrez
*Assistant Examiner*—My X Nguyen
(74) *Attorney, Agent, or Firm*—Thomas, Kayden, Horstemeyer & Risley (57) ABSTRACT

Providing communication between a network communication device and a mobile communication device is disclosed. A server is in communication with a mobile communications network. The server communicates with mobile communication devices in the mobile communications network using a first protocol. The server monitors the state of each mobile communication device, and provides network state information for a group of mobile communication devices to a network communication device. The network communication device and the server communicate using a second protocol, and the network communication device is adapted to display network state information for the group of mobile communication devices and adapted to provide a user interface for communicating with the mobile communication devices. The network communication device includes logic for receiving network information for a communications network. The network information is related to the presence of a mobile communication device in the communications network. The network communication device also includes logic for transmitting a first message to the communications network.

9 Claims, 7 Drawing Sheets

MESSAGING SYSTEM IN A HYBRID NETWORK AND MOBILE COMMUNICATION ENVIRONMENT

TECHNICAL FIELD

The present disclosure is generally related to messaging systems and, more particularly, is related to messaging between networked devices and mobile communication devices.

BACKGROUND

Today, a user of a mobile communication device such as a cell phone can receive and transmit calls and messages. A person might send a message to a user of a mobile communication device for various reasons such as the person might know that the user is not currently available for a telephone call. A problem associated with sending a message instead of calling is that the person sending the message often does not know if the message was delivered.

Thus, a heretofore unaddressed need exists in the industry to address the aforementioned deficiencies and inadequacies.

SUMMARY

Embodiments, among others, of the present disclosure provide communications between a network communication device and a mobile communication device.

Briefly described, in architecture, one embodiment of a system, among others, can be implemented as follows. A server is in communication with a mobile communications network. The server communicates with mobile communication devices in the mobile communications network using a first protocol. The server monitors the state of each mobile communication device, and provides network state information for a group of mobile communication devices to a network communication device. The network communication device and the server communicate using a second protocol, and the network communication device is adapted to display network state information for the group of mobile communication devices and adapted to provide a user interface for communicating with the mobile communication devices.

Briefly described, in architecture, one embodiment of the network communication device, among others, can be implemented as follows. The network communication device includes logic for receiving network information for a communications network. The network information is related to the presence of a mobile communication device in the communications network. The network communication device also includes logic for transmitting a first message to the communications network.

Embodiments, among others, of the present disclosure can also be viewed as providing methods for communicating with a mobile communication device. In this regard, one embodiment of such a method, among others, can be broadly summarized by the following steps: receiving network information for a communications network, the network information being related to the presence of a mobile communication device in the communications network; and transmitting a first message to the communications network, wherein the communications network relays the first message to the mobile communication device.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art of the present invention.

Figure 1:
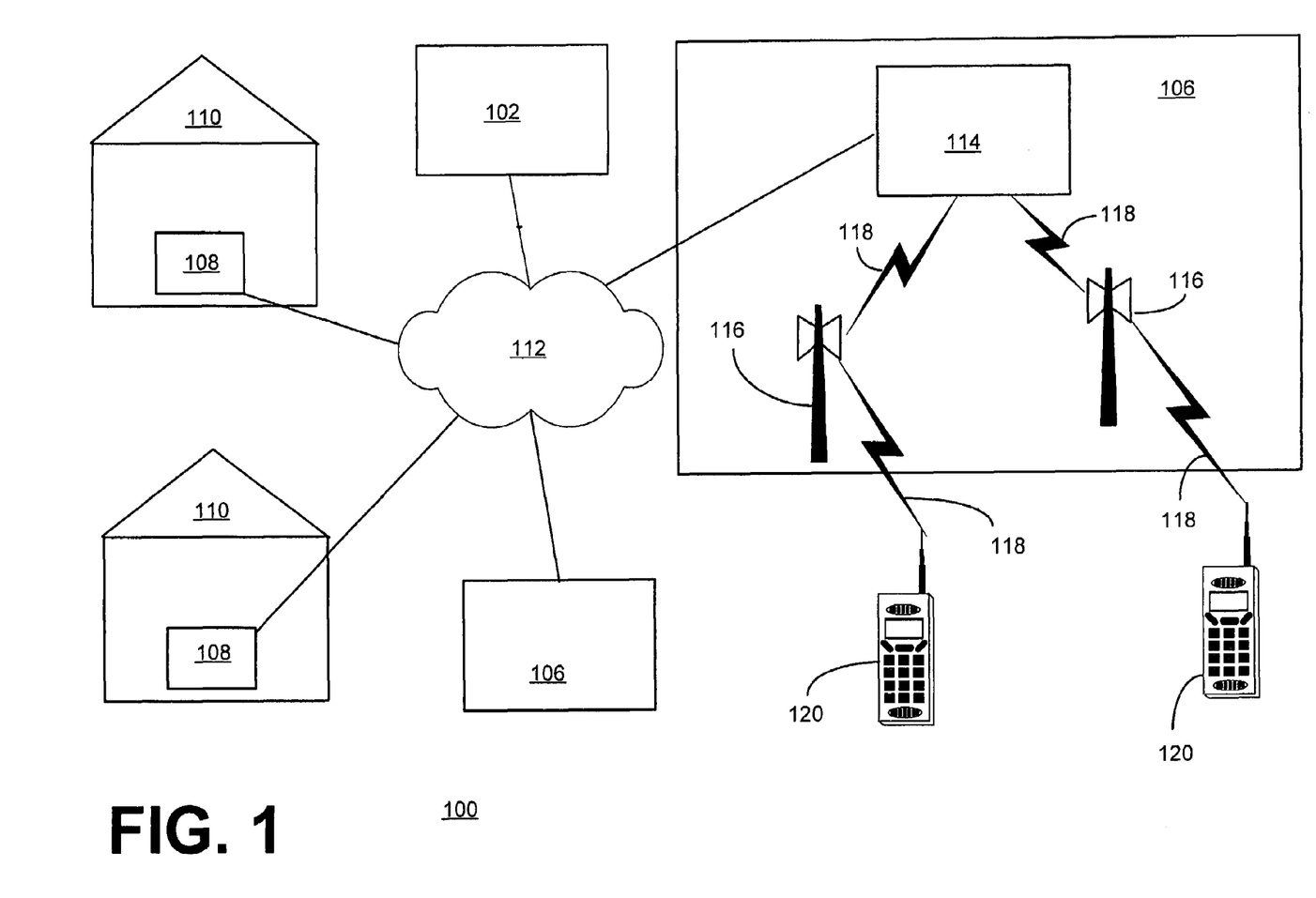
FIG. 1 is a block diagram of an exemplary messaging system.

FIG. 1 is a simplified block diagram of a first embodiment of a messaging system. In the first embodiment, people, businesses, organizations, etc. subscribe to a messaging service provider 102, which, among other things, provides messaging services through a plurality of wireless communication service providers 106. Each one of the subscribers of the messaging service provider 102 has a network communication device 108 that is located at the subscriber's premises 110.

As will be explained in detail hereinbelow, subscribers of the messaging service provider 102 receive, among other things, network information related to selected users of the wireless communication service providers 106. The subscribers of the messaging service provider 102 use their network communication devices 108 to communicate written messages to selected users of the wireless communication service providers 106. For the purposes of this disclosure, a network communication device is a device that has an internet protocol (IP) address and uses the IP address in communications.

The messaging service provider 102 communicates with the wireless communication service providers 106 and with the network communication devices 108 via the a network, such as the Internet 112. The network communication devices 108 and wireless communication service providers 106 also communicate with each other via, e.g., the Internet 112. In another embodiment, the network communication devices 108 and wireless communication service providers 106 communicate with each other via public and private networks known to those skilled in the art such as, but not limited to, private—corporate intranet, and virtual private networks over public networks.

The wireless service provider 106 includes a central office 114 and a plurality of base stations 116. The central office 114 transmits signals over communication links 118 to the base stations 116, which then relay the signals to mobile communication devices 120 such as a cellular mobile telephone or personal digital assistants (PDAs) or mobile data entry terminals. In some embodiments, the base stations 116 are in communication with the central office 114 via a high bandwidth wired/optical communication link. For the purposes of this disclosure, mobile communications devices include, among others, devices that communicate using cellular connectivity such as, but not limited to, Asynchronous Communication, Short Message Service (SMS), Code Division Multiplexed Access (CDMA), Time Division Multiplex Access (TDMA), Wave Division Multiplex Access (WDMA), and Global System for Mobile Communications (GSM).

As will be described in detail herein below, the mobile communication devices 120 communicate with the service providers 106 when they come "on-network." For the purposes of this disclosure, a given communication device 120 is considered to come "on-network" in a network of a given service provider 106 when the given communication device 120 initiates communication with the given service provider 106 such that the given service provider 106 becomes aware of the given communication device 120. The "on-network" communication may be automatic, e.g., when the mobile communication device 120 is turned on and within range of a base station 116, or manual, e.g., the user of the mobile communication device 120 sends an "on-network" message to the wireless communication service provider 106.

As will be described in detail herein below, the messaging service provider 102 enables the network communication devices 108 to communicate with selected/predetermined "on-network" mobile communication devices 120. A subscriber defines his or her own group of members and registers mobile communication devices that belong to or are associated with members of the subscriber's group. The mobile communication devices are registered with the messaging service provider 102. In one embodiment, the mobile communication devices of members are registered with the wireless communication service provider 106.

In this disclosure a "family" is used to illustrate a group, and the husband, wife, son and daughter of the family are the members of the illustrative group. However, the family group described here is for illustrative purposes only. Each subscriber can include members to his or her own group as the subscriber sees fit. In one embodiment, the messaging service provider 102 charges a subscriber a flat fee for having a group that is less than a predetermined number and charges a graduated fee for more members.

Figure 2:
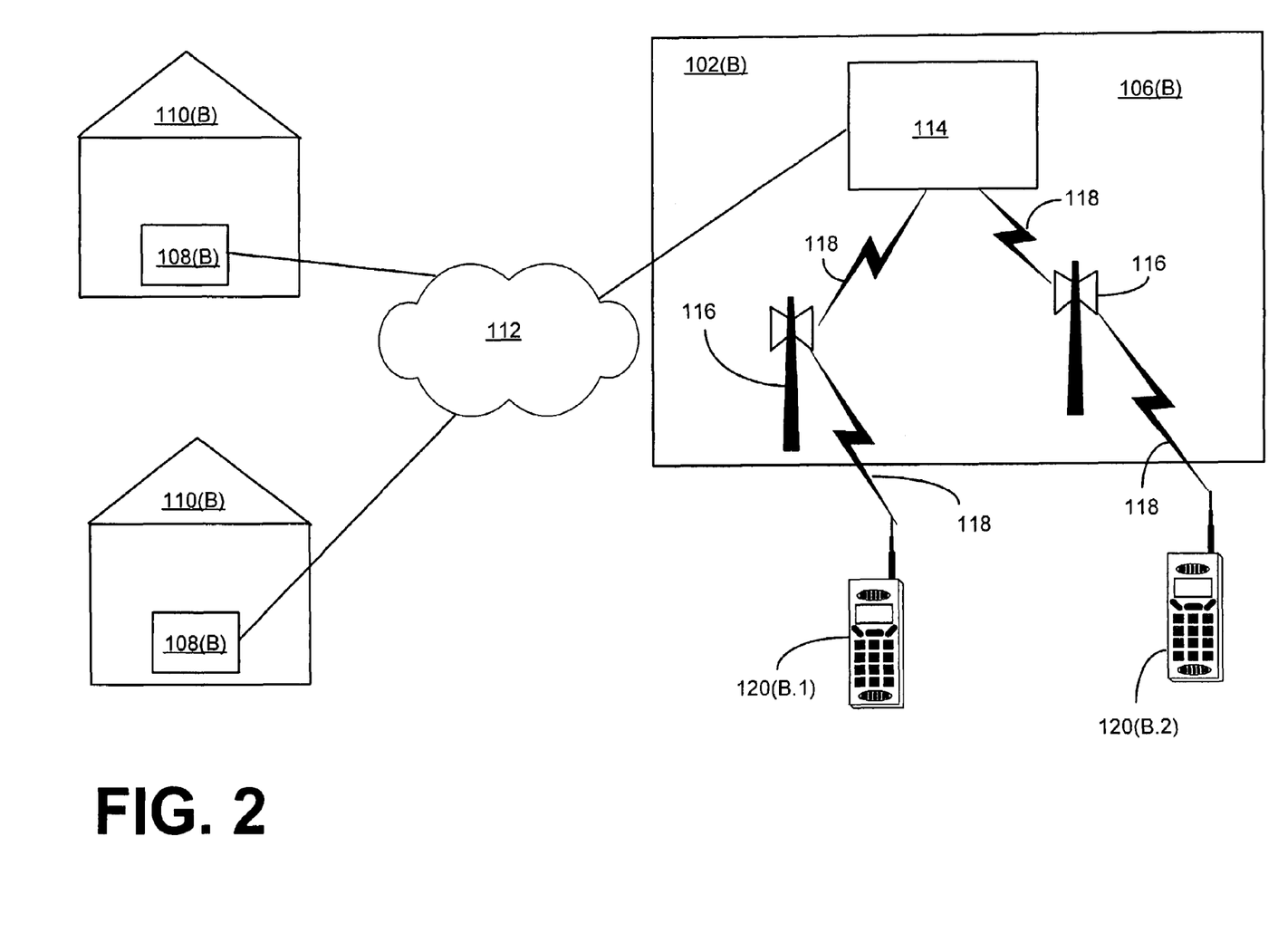
FIG. 2 is a block diagram of an exemplary second messaging system.

FIG. 2 illustrates a simplified block diagram of a second embodiment of a messaging system. In this second embodiment, a wireless communication service provider 106(B) provides both wireless communication to a plurality of mobile communication devices 120(B.1) and 120(B.2) through a plurality of base stations 116(B) and provides messaging services for its subscribers to the mobile communication devices 120(B.1) and 120(B.2).

The subscribers of the wireless communication service provider 106(B) have subscriber premises 110(B), and located at subscribers premises 110(B) are network communication devices 108(B). A subscriber uses his or her network communication device 108(B) to communicate with "on-network" members belonging to the subscriber's group. As will be explained in detail herein below, messages from the network communication devices 108(B) are transmitted to a central office 114(B) via the Internet 112(B). The central office 114(B) relays the messages to "on-network" members. In this embodiment, the wireless communication service provider 106(B) includes the necessary components for providing the functionality of the messaging service provider 102.

Figure 3:
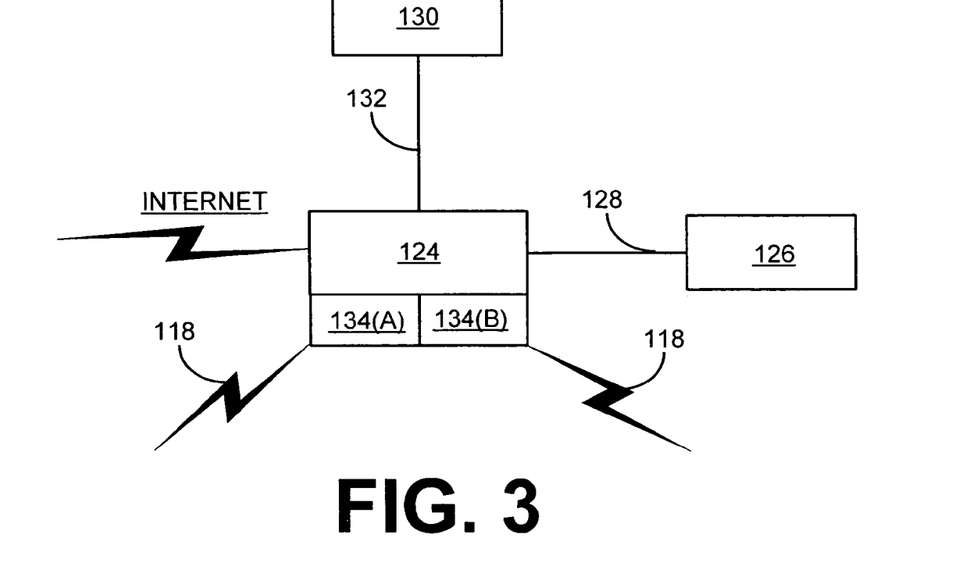
FIG. 3 is a block diagram of selected components of an exemplary mobile communications service provider.

FIG. 3 is a simplified block diagram of selected components of the central office 114(B). It should be noted that a simplified block diagram of selected components of the central office 114 would be essentially the same. With reference to FIG. 3, in addition to FIG. 2, the central office 114(B) includes a wireless gateway server 124 that is connected to a database 126 by a communication link 128, and a controller 130 that is connected to the server 124 by a communication link 132. The wireless gateway server 124 includes a plurality of interfaces 134 for communicating with mobile communication devices 120. Non-limiting examples of interfaces 134 includes Information Standard 41 (IS41) and Short Message Service (SMS) interfaces.

Among other things, the controller 130 registers mobile communication devices of a subscribers group into the messaging system 100. For each member, the subscriber will provide the controller 130 with the telephone number of the mobile communication device 120 belonging to or associated with a member of the subscriber's group. In addition, in some embodiments, the subscriber will provide the controller with addresses such as standard e-mail addresses or other SMS equivalent numerical addresses for communication devices that do not have a telephone number. The controller 130 associates registered mobile communication devices with the subscriber's group, and the association is stored in database 126.

Typically, the registration of a mobile communication device 120 is accomplished via an e-mail message from the network communication device 108 belonging to the subscriber. The message includes the telephone number of the mobile communication device 120 being registered and identifies the subscriber and/or the network communication device 108 that sent the message. The database 126 includes subscriber group tables 129. Each subscriber group table 129 associates the members of a group with a network communication device 108. However, a subscriber group table 129 can also be associated with multiple network communication devices 108. For example, a subscriber might have a network communication device at his or her work and another at his or her home, and both of the network communication devices of that subscriber could be associated with the same subscriber group table 129.

The database 126 also includes a list of "on-network" mobile communication devices 120 that are currently on-network. The current "on-network" mobile communication devices 120 includes subscribers of the wireless communication service provider 106 whose mobile communication devices 120 are turned on and within range of a base station 116. Other "on-network" mobile communication devices 120 can belong to subscribers of different wireless communication service providers that have "roamed" into the network of the wireless communication service provider 106.

The interface 134(A) receives a signal from the mobile communication device 120(B.1), which is adapted to automatically signal that it is "on-network". The signal from the mobile communication device 120(B.1) identifies the mobile communication device 120(B.1) as being the sender of the signal. Responsive to receiving an "on-network" signal from the mobile communication device 120(B.1), the server 124 updates the "on-network" list of mobile communication devices. The mobile communication device 120(B.1) will send follow-up signals indicating that it is still "on-network". If the server 124 does not receive a follow-up "on-network" signal within a predetermined time of the last "on-network" signal, the server 124 updates the list of "on-network" mobile communication devices in database 126 to indicate that the mobile communication device 120(B.1) is now "off-network."

In one embodiment, the wireless communication service provider 106 provides services for mobile communication devices that include third generation (3G) mobile telephone technology, and the database 126 includes a Home Location Register (HLR) known to those skilled in the art. Those skilled in the art recognize that a wireless communication service provider employing 3G mobile telephone technology receives "on-network" signals from 3G compliant mobile communication devices, which are then registered in the HLR. Thus, in one embodiment, the list of "on-network" communication devices in the database 126 is the HLR.

Via interface 134(B) the server 124 receives "on-network" messages from the mobile communication device 120(B.2). The "on-network" messages from the mobile communication device 120(B.2) are sent from the mobile communication device 120(B.2) responsive to user input at the mobile communication device 120(B.2). Typically, the "on-network" message from the mobile communication device 120(B.2) is an SMS message. The "on-network" message from the mobile communication device 120(B.2) can be manually written by the user of the mobile communication device 120(B.2) or can be sent responsive to the user selecting an option. Once the server 124 has received the manual "on-network" message from the mobile communication device 120(B.2), the list of "on-network" mobile communication devices in the database 124 is updated. When the server 124 receives an "off-network" message from the mobile communication device 120, the server 124 updates the "on-network" list. The "off-network" message is sent responsive to user input.

Figure 4:
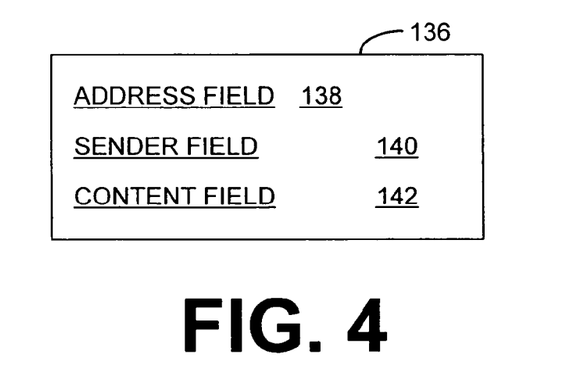
FIG. 4 is a block diagram of an exemplary message template.

FIG. 4 illustrates a message template 136, and the message template 136 includes an address field 138, a sender field 140 and a content field 142. With further reference to FIG. 4, in some embodiments, the mobile communication device 120 includes the message template 136 in a memory. When the user of the mobile communication device 120 wants to register his or her mobile communication device as being "on-network" the user initiates registration by providing user input. To initiate registration, the user might press a button or a keypad, select an option in a menu, or use a keypad to manually write a message. Typically the message is a Short Message Service (SMS).

Figure 5A:
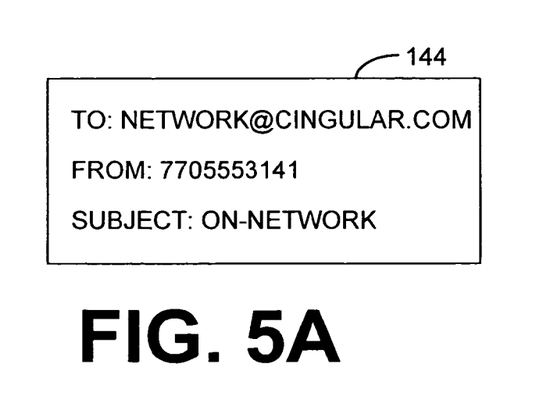
FIG. 5A is a block diagram of an exemplary on-network message.
Figure 5B:
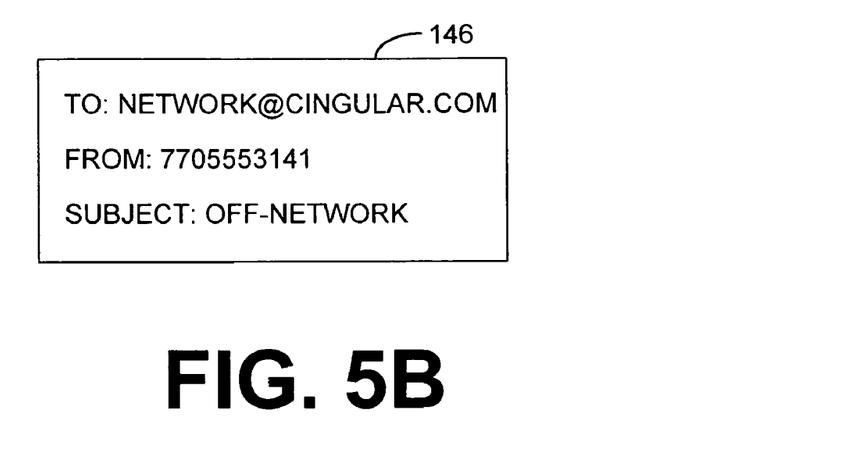
FIG. 5B is a block diagram of an exemplary off-network message.

FIGS. 5A and 5B illustrate an exemplary "on-network" message 144 and an exemplary "off-network" message 146, respectively. With further reference to FIGS. 5A and 5B, responsive to user input such as selecting an option in a menu, the mobile communication device 120(B.2) generates a copy of the message template 136 and populates the fields 138, 140 and 142. The address field 138 is populated with a unique address such as "Network@ Cingular.com." The mobile communication device 120(B.2) populates the sender field 140 with an identifier of the mobile communication device 120(B.2). Typically, the identifier of the mobile communication device 120(B.2) is the telephone number of the mobile communication device, however, other identifiers can also be used. The identifier for the sender is unique to the mobile communication device 120(B.2) at least within the network established by the service provider 106. The mobile communication device 120(B.2) populates the content field 142 with a predetermined message that signifies whether the mobile communication device 120(B.2) is going on-network or off-network. For the on-network message 144, the content field 142 is populated by the message "on-network," and for the off-network message 146, the content field 142 is populated by the message "off-network.

Among other things, the server 124 provides member network information to network communication devices 108. Generally, the member network information provided to a given network communication device is related to the communicative state of a member's mobile communication device 108, e.g., whether a given member's mobile communication device 108 is on-network or off-network. The member network information might also include a source indicator that is related to how the server 124 knows that the member is on-network or off-network. In other words, the source indicator would indicate whether the server 124 received an on-network message 144 or whether the server 124 automatically determined that mobile communication device 108 was on-line via interface 134(A). In addition, some mobile communication devices 108 include an Instant Messaging (IM) client, and for those mobile communication devices 108, the server 124 can detect the presence of those mobile communication devices 108 using IM protocols, and in that case, the source indicator might be related to IM. In addition, the network information might include state information such as, but not limited to, "idle," "off-line," etc. that is related to the availability of the user of the mobile communication device 108.

Figure 6:
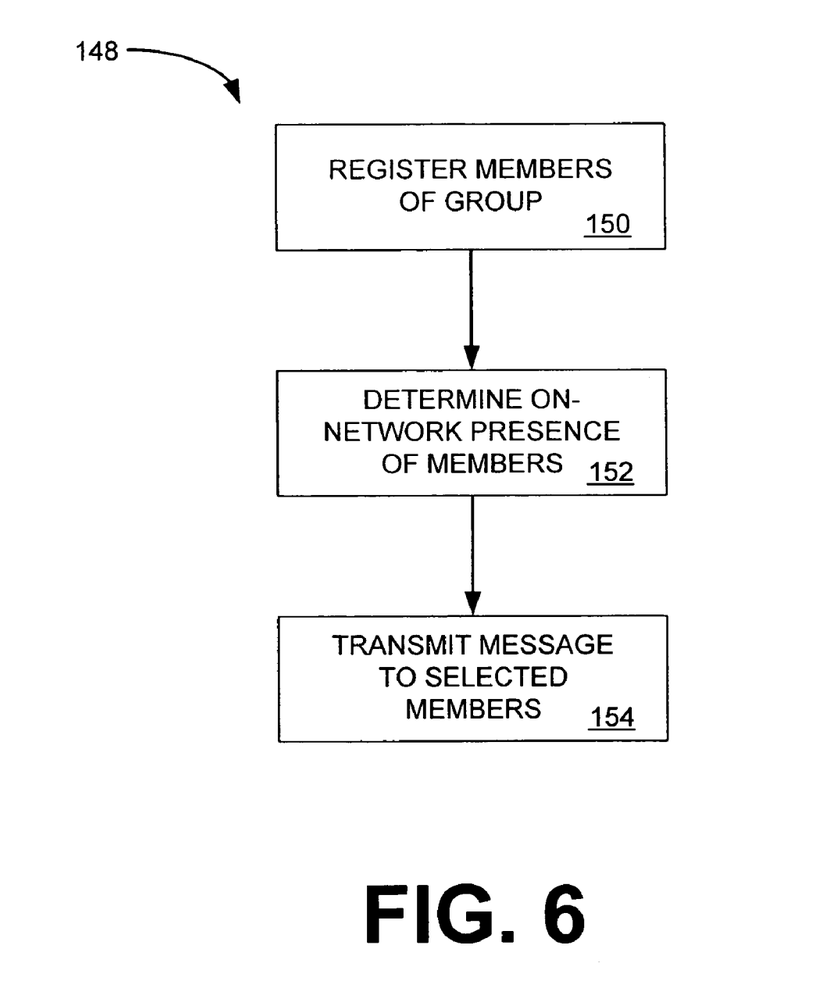
FIG. 6 is a flow chart showing exemplary steps for sending a message to a mobile communication device.

FIG. 6 illustrates a chart having steps 148 that illustrate exemplary steps taken by the network communication device 108 of a subscriber. In step 150, the subscriber registers members of his or her group with the messaging service provider 102 by providing telephone numbers belonging to selected mobile communication devices. The network communication device 108 transmits a message that includes one or more of the telephone numbers provided by the subscriber to the messaging service provider 102. The message includes information for identifying the subscriber and/or the group of the subscriber.

In step 152, the network communication device 108 determines which of its members have an "on-network" presence, i.e., which of the mobile communication devices belonging to members are currently "on-network". The network communication device determines "on-network" presence of members based upon member network information received from the server 124. The member network information from the server 124 generally includes a list of currently "on-network" mobile communication devices and/or a list of mobile communication devices that have changed state, i.e., have gone from "on-network" to "off-network" and vice-a-versa. In an alternative embodiment, the member network information is received from the messaging service provider 102.

As previously described hereinabove, the member network information received from the server 124 might also include a source indicator that is related to how the server "knows" the presence or lack thereof of a given mobile communication device. In one embodiment, the network communication device 108 applies different weightings to the various source indicators to determine whether a given mobile communication device is on-network or not. For example, when the user of a mobile communication device does something such as causing the transmission of an on-network message 144 or an off-network message 146 or initiating IM, then source indicators related to affirmative actions taken by the user will have a higher rating than source indicators that are not related to affirmative actions by the user.

In step 154, a user uses the network communication device 108 to communicate with selected members of his or her group. In one embodiment, the network communication device 108 sends a message from the user to selected members, i.e., to mobile communication devices associated with selected members of the group, only if the mobile communication devices are "on-network". In an alternative embodiment, the network communication device 108 sends messages to selected members of the group whether or not they are "on-network", but the server 124 holds the messages for members that are "off-network" until they are "on-network".

Figure 7:
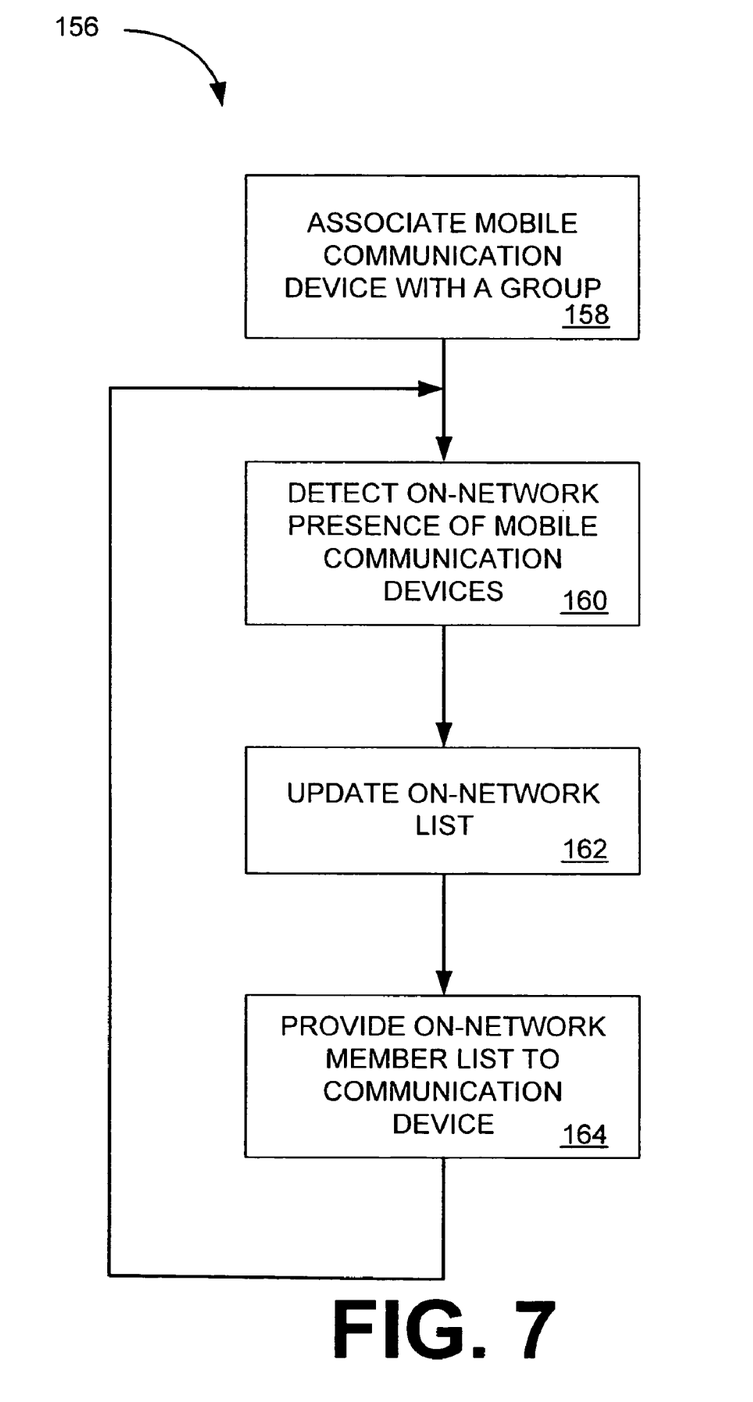
FIG. 7 is a flow chart showing exemplary steps for providing network state information.

FIG. 7 illustrates a flow chart having exemplary steps 156, which are taken by the server 124. In step 158, the server 124 associates telephone numbers of mobile communication devices with a specific group. The group association or subscriber group list 129 is stored in the database 126. Thus, the server 124 can determine for any mobile communication device, which group, if any, the mobile communication device is associated with.

In step 160, the server 124 detects a mobile communication device as being "on-network". The "on-network" detection is based upon information received from the mobile communication devices that are currently "on-network".

In step 162, the server 124 updates the "on-network" list 131 stored in the database 126. The "on-network" list 131 is updated to add mobile communication devices that have recently changed their state from "off-network" to "on-network" and vice-a-versa. The server 124 changes the state of a mobile communication device to "off-network" if the server 124 receives an "off-network" message 146 and/or if the server 124 has not received an "on-network" message from the mobile communication device within a predetermined time span.

In step 164, the server 124 provides the network communication device 108 with current member network information. The member network information can include a list of members that are currently "on-network", or a list of members that are currently "off-network", or a list of members that have changed states. In an alternative embodiment, the server 124 provides member network information to the messaging service provider 102. The server 124 continues to loop over steps 160, 162 and 164.

Figure 8:
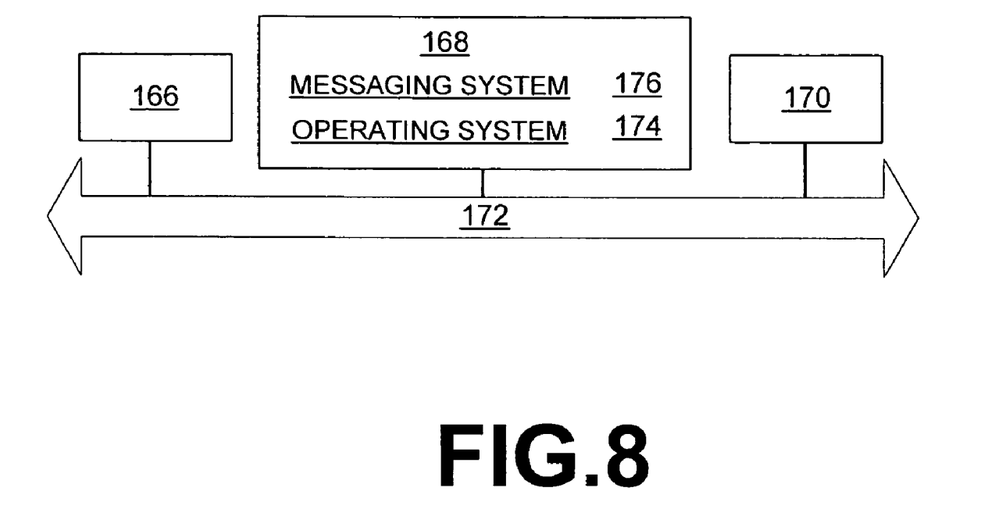
FIG. 8 is a block diagram of an exemplary network communication device.

FIG. 8 illustrates a simplified block diagram of selected components of the network communication device 108. The network communication device 108 includes a processor 166, a memory 168, and one or more input and/or output I/O devices 170 (or peripherals) that are communicatively coupled via a local interface 172. The local interface 172 can be, for example but not limited to, one or more buses or other wired or wireless connections as is known in the art. The local interface 172 may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 166 is a hardware device for executing software, particularly that stored in memory 168. The processor 166 can be any custom made or commercially available process. A central processing unit (CPU), an auxiliary processor among several processors associated with the network communication device 108, a semi-conductor based microprocessor (in the form of a microchip or chip set), a macroprocessor or generally any device for executing software instructions. Examples of suitable commercially available microprocessors are as follows: (a) PA-RISC series microprocessor from Hewlett-Packard Company, an 08×86 or Pentium series microprocessor from Intel Corporation, a power PC microprocessor from IBM, a Sparc microprocessor from Sun Microsystems, Inc., or a 68XXX series microprocessor from Motorola Corporation.

The memory 168 can include any one or combination of volatile memory elements (e.g., random access memory (RAM, DRAM, SRAM, SDRAM, etc.)) and non-volatile memory elements (e.g., ROM, hard-drive, tape, CD-ROM, etc.). Moreover, the memory 168 may incorporate electronic, magnetic, optical, and other types of storage media. Note that the memory 168 can have a distributed architecture, where various components are situated remote from one another, but can be accessed by the processor 166.

The memory 168 includes operating system O/S software 174 and member messaging application software 176. The O/S software 174 is implemented by the processor 166 to essentially control the execution of other programs and applications such as member messaging system software 176. The O/S may also provide scheduling, input-output control, file and data management, memory management and communication control and related services.

The member messaging application 176 is a source program, executable program (object code), script, applet or any other entity comprising a set of instructions to be performed. When the member messaging system is a source program, then the program needs to be translated via a compiler, assembler, interpreter, or the like, which may or may not be included in the memory 168, so as to properly operate in connection with the O/S 174. Furthermore, the member messaging system 176 can be written as (a) an objected oriented programming language, which has classes of data and methods, or (b) a procedure programming language, which has routines, subroutines, and/or functions for example, but not limited to, (c) C++, PASCAL, BASIC, FORTRAN, COBAL, PEARL, JAVA and ADA. In some embodiments, the member messaging system 176 is a JAVA applet running in a browser application.

Figure 9:
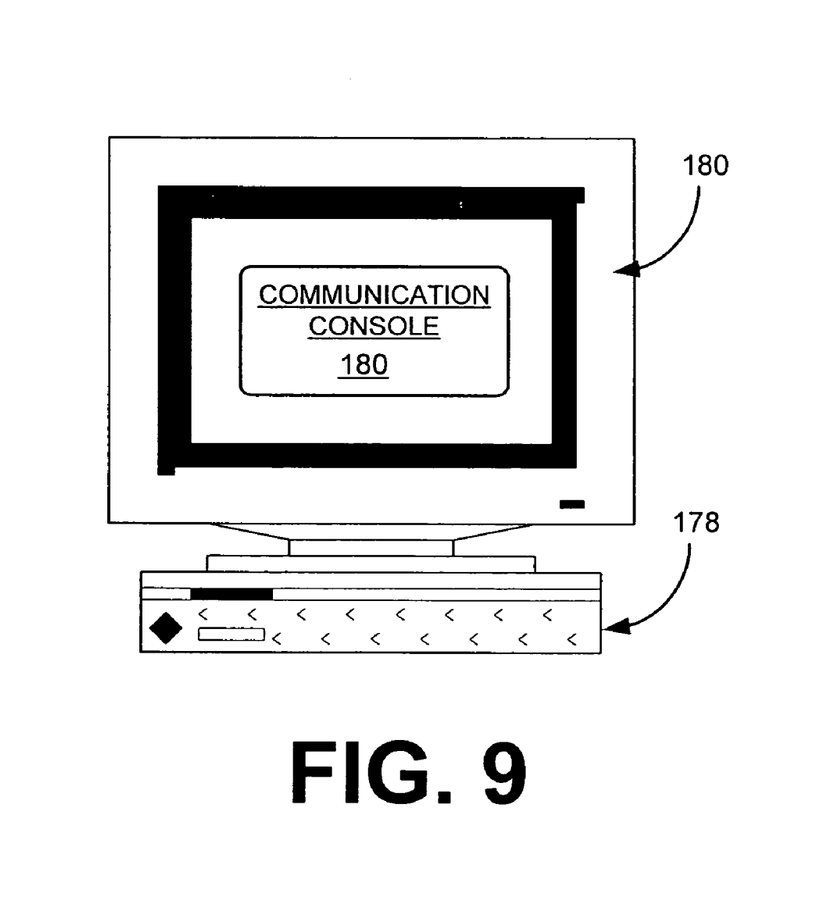
FIG. 9 is a diagram of an exemplary computer having a communication console.

Refer to FIG. 9, in one embodiment, the network communication device 108 is a computer system 178 such as a personal computer having a keyboard and mouse (not shown) that provide a user input interface and a monitor 180 provides a graphical and textual user output interface. Displayed on the monitor 180 is a communication console window 182. Among other things, the communication console window 182 provides a user with an interface for communicating with members of the user's group.

In some embodiments, the member messaging system 176 includes logic for, among other things, adding/deleting/editing members and the telephone numbers associated with the members. When the user of the network communication device 108 add/deletes or edits the telephone number for a member, the network communication device 108 sends a message, which identifies the network communication device 108 and includes the telephone number for the member being added/deleted/edited, to the messaging service provider 102. The messaging service provider 102 then has the server 124 edit the group membership list for the network communication device 108. In one embodiment, the server 124 is a web server that subscribers of the messaging service provider 102 can access using the computer system 178, which includes a web browser (not shown). By accessing the web server 124, the subscriber can enter and/or edit his or her group membership list.

The member messaging system 176 also includes logic for, among other things, displaying member information such as which members are currently on-network and which members are currently off-network. In addition, the member messaging system 176 includes logic for, among other things, providing a user interface, receiving and sending messages, etc.

The member messaging system 176, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain or store the program for use by or in connection with the instruction execution system, apparatus, or device. The computer readable medium can be, for example but not limited to, an electronic, magnetic, optical, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the present disclosure in logic embodied in hardware or software-configured mediums.

Figure 10:
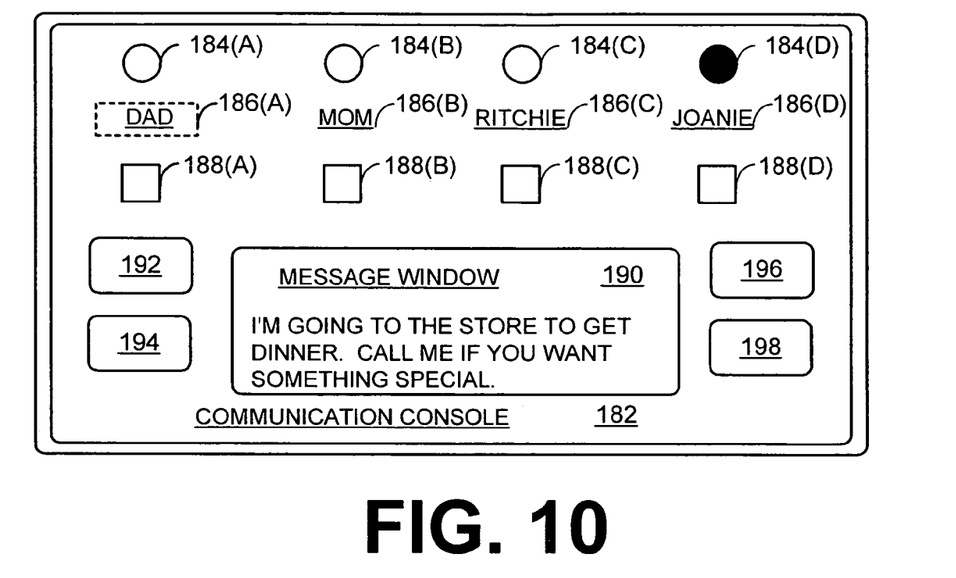
FIG. 10 is a diagram of an exemplary communication console.

FIG. 10 is an exemplary block diagram of an exemplary communication console window 182. The communication console window 182 includes member presence indicators 184, member identifiers 186, and checkbox/sent/received indicators 188. In this exemplary embodiment, the member presence indicator 184(A) the member identifier 186(A) and the member checkbox/sent/received indicator 188(A) are all associated together. Each member of the group has a member presence indicator, member identifier, and a member checkbox/sent/received indicator.

In one embodiment, the console window 182 is a web page that is displayed at the computer system 178 by a web browser (not shown). A user of the computer system 178 can access the server 124 to retrieve the console window 182.

For each member, the member presence indicator 182 associated with that member indicates whether or not that member is currently "on-network". The member presence indicator 184 for an "on-network" member is illuminated and dimmed if the member is currently "off-network".

In the exemplary communication console window 182, there are four members listed: mom, dad, Richie and Joanie. Each member's name is shown within a member identifier box 186. In this example, the member presence indicators 184(A)-184(C) are currently illuminated, and the member presence indicator 184(D) is dimmed. Thus, Dad, Mom, and Ritchie are currently "on-network," and Joanie is currently "off-network."

The communication console window 182 is intended to be flexible/adaptable such that it can display more or fewer names and the associated member presence indicators 182 and checkbox/sent/received indicators 188. For example, if there are more members than can be displayed at one time, then the communication console window 182 may include scroll bars to enable the user of the network communication device 108 to scroll through the entire membership.

The communication console window 182 also includes subject/message window 190, a "select all" button 192, a "send" button 194, a sender pull-down menu 196, and a subject/message window toggle 198. The user uses the subject/message window toggle 198 to toggle the subject/message window 190 between subject window mode and message window mode. In subject window mode, the information typed into the subject/message window 190 is placed in the subject header of a message. In message mode, the information typed into the subject/message window 190 is placed in the content of a message.

The user uses the sender pull-down menu 196 to select a "name" that identifies the sender. Normally, the sender pull-down menu 196 lists all of the members within the group.

The user of the member messaging system 176 selects recipients for the message in a variety of ways. In one case, the user may select individual or multiple members of the group by selecting the checkbox/sent/received indicator for certain members. For example, if "mom" wants to send the message, "I'm going to the store to get dinner. Call me if you want something special" to "Dad", then she will select his checkbox/sent/received indicator 188(A). Upon being selected, checkbox/sent/received indicator 188 indicates that it has been selected by displaying a check mark, or X, or other indicator. The user may also use the "select all" button 192 to select everyone in the group as intended recipients. However, the user may then unselect himself, or herself or others by clicking the appropriate checkbox/sent/received indicator(s) 188 for members that the user wishes to unselect.

The user of the member messaging system 176 uses the send button 194 to transmit messages. The messages are transmitted from the network communication device 108 to the server 124. Generally, the messages are sent as e-mail messages. Upon receipt, the server 124 parses the e-mail messages and then retransmits them to intended recipients as SMS messages.

In some embodiments, the network communication device 108 will transmit messages for selected members to the wireless communication service provider only if the selected members are on network which the sender knows by looking at the member presence indicators 184 of the selected members. Thus, for example, if "Joanie," who is currently off-network, is selected as a recipient of a message, then the network communication device 108 keeps the messages addressed to her until she is "on-network". On the other hand, if "dad," who is currently on-network, is selected as a recipient, then his message is sent without delay.

In one embodiment, the checkbox/sent/received indicators 188 are capable of indicating various message states, and the various message states are generally indicated by changes in color, illumination, animation, and other techniques known to those skilled in the art. For example, after the user attempts to send a message, the checkbox/sent/received indicators 188 of the selected recipients change from a "check" to a "transmitting" mode, and the checkbox/sent/received indicators for the members who were not selected are dimmed. "Transmitting" mode can be indicated by a variety of ways such as a pulsing indication, a rotating indicator, or other animation, etc. For "off-network" members who are selected recipients, their checkbox/sent/received indicators remain in "transmitting" mode until their messages are sent.

In one embodiment, messages may be delayed indefinitely until the recipient is "on-network" or for a predetermined amount of time. If the message is not transmitted during the predetermined amount of time, the checkbox/sent/received indicator for that member changes to a "not sent" mode.

Once the message has been sent to a member, the checkbox/sent/received indicator for that member changes to "sent" mode.

In one embodiment, when a member receives a message at his or her mobile communication device 120, the mobile communication device 120 responds with an acknowledgement message that acknowledges receipt of the message. The acknowledgement message is transmitted from the mobile communication device 120 to the server 124. The server 124 formats the acknowledgement communication message into a format for transmission over the Internet and sends the message to the network communication device 108.

Upon receiving the acknowledgement message from a given member, the member messaging system 176 changes the mode of the checkbox/sent/received indicator 188 of the given member from "sent" to "received".

Figure 11:
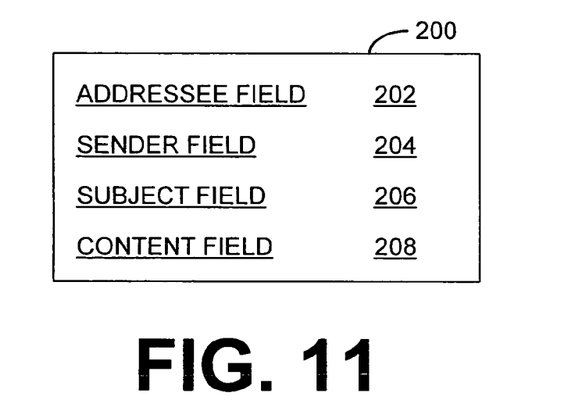
FIG. 11 is a block diagram of an exemplary message template for communicating with a mobile communication device.

FIG. 11 illustrates an exemplary message template 200 which is stored in the memory 168 of the network communication device 108. The message template 200 includes an addressee field 202, a sender field 204, a subject field 206, and a content field 208. The network communication device 108 generates a copy of the message template 200 and populates the addressee field 202 with the telephone numbers for the members of the group that have been selected. The sender field 204 is populated with an identifier associated with the network communication device 108. The subject field 206 and content field 208 are populated with information provided by the user of the network communication device 108.

Figure 12:
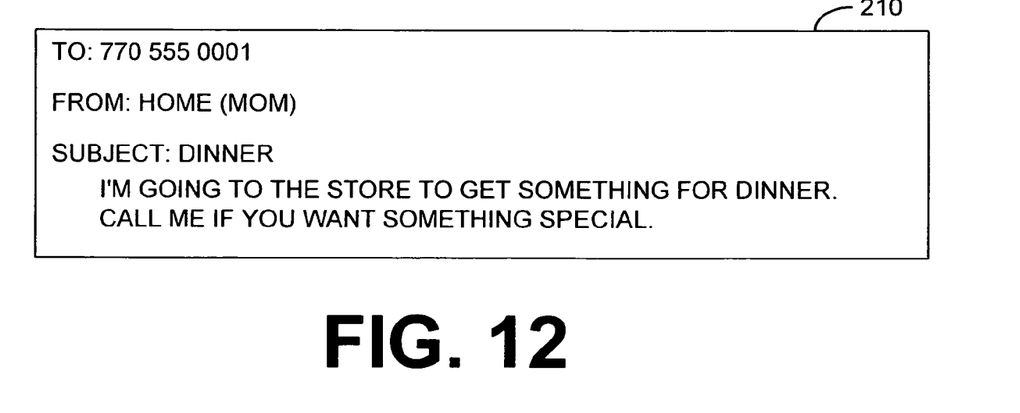
FIG. 12 is a diagram of an exemplary message sent from a network communication device to a mobile communication device.

FIG. 12 illustrates a message 210 generated at the network communication device 106 for a member of its group. Message 210 was generated by the user "Mom." The sender field 204 indicates that the message 210 came from the network communication device 108 by using "Home" as a designator and indicates that "Mom" was the member who sent the message 210. The addressee field 202 is populated with "Dad's" telephone number so that the service provider 106 will know to whom to relay the message. The subject field 206 and content field 208 include the information that "Mom" entered into the subject/message window 190. After the network communication device 108 has populated the fields of the message 210, as shown in FIG. 11, the network communication device includes the message 210 in an e-mail to the service provider 106, which then parses the e-mail and sends the messages 210 to the intended recipient in an SMS message.

It should be emphasized that the above-described embodiments of the present disclosure, particularly, all embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A method of communicating with a mobile communication device, the method comprising:

providing the communications network with one identifier for each mobile communication device in a group of mobile communications devices;

receiving network information for a given mobile communication devices included in the group, wherein the network information is related to the presence of the given mobile communication device in the communications network and indicates that the give mobile communication device is in a given state, the given state selected from the group consisting of off-network and on-network;

before transmitting any user communication message to the mobile communications device, processing the network information to determine whether the mobile communication device is present on the communications network;

responsive to determining that the mobile communication device is not present on the communications network, delaying the transmission of the first user communication message, wherein the transmission of the first user communication message is delayed until the mobile communication device is present on the communications network;

transmitting a first user communication message to the communications network for user messaging, wherein the communications network relays the first user communication message to the mobile communication device; and displaying to a user information related to delivery of the first user communication message, wherein prior to receiving a second user communication message from the communications network, displaying to a user information conveying that the first user communication message has not been received by the mobile communication device; and responsive to receiving the second user communication message from the communications network, displaying to the user information conveying that the first user communication message has been received by the mobile communication device.

2. The method of claim 1, further including:
monitoring the presence of the mobile communication device in the communications network through a series of network information messages;
displaying to a user information indicating the current state of the mobile communications device in the communications network, wherein the current state is one of the group consisting of on-network and off-network; and
responsive to the state of the mobile communication device changing, displaying the new state of the mobile communication device.

3. A method of providing information from a sender to a mobile communication device in a communications network for user messaging, the method comprising:
detecting the presence of the mobile communication device in the communications network for user messaging;
providing the sender with network information related to the presence of the mobile communication device in the communications network for user messaging;
receiving a first user communication message from the sender, the first user communication message carrying content and formatted according to a first protocol;
before transmitting any user communication message to the mobile communications device, processing the network information to determine whether the mobile communication device is present on the communications network;
responsive to determining that the mobile communication device is not present on the communications network, delaying the transmission of the first user communication message, wherein the transmission of the first user communication message is delayed until the mobile communication device is present on the communications network;
transmitting a second user communication message to the mobile communications device, wherein the second user communication message carries the content of the first user communication message and is formatted according to a second protocol;
receiving a third message from the mobile communication device, the third message confirming that the mobile communication device received the second user communication message; and responsive to receiving the third message, transmitting a fourth message to the sender, wherein the fourth message confirms that the mobile communication device received the content of the first user communication message; and
monitoring the current state of the mobile communication device in the communications network, wherein the current state is one of the group consisting of on-network and off-network; and responsive to the state of the mobile communication device changing, transmitting network information related to the change of state of the mobile communication device to the sender.

4. The method of claim 3, wherein the first user communication message is an electronic email carried over the internet, and the protocol of the second user communication message is a Short Message Service protocol.

5. A computer readable storage medium in a network communication device for communicating with a mobile communication device comprising:
logic for providing the communications network with one identifier for each mobile communication device in a group of mobile communications devices;
logic for receiving network information for a given mobile communication devices included in the group, wherein the network information is related to the presence of the given mobile communication device in the communications network and indicates that the give mobile communication device is in a given state, the given state selected from the group consisting of off-network and on-network;
logic for, before transmitting any user communication message to the mobile communications device, processing the network information to determine that the mobile communication device is not present on the communications network;
logic for delaying the transmission of the first user communication message, wherein the transmission of the first user communication message is delayed until the mobile communication device is present on the communications network;
logic for transmitting a first user communication message to the communications network for user messaging, wherein the communications network for user messaging relays the first user communication message to the mobile communication device;
logic for displaying to a user information related to the presence of the mobile communication device in the communication network, wherein the displayed information conveys that the mobile communication device is in a given state, the given state selected from the group consisting of off-network and on-network;
logic for displaying to a user information related to delivery of the first user communication message, wherein
prior to receiving a second user communication message from the communications network, displaying to a user information conveying that the first user communication message has not been received by the mobile communication device; and
responsive to receiving the second user communication message from the communications network, displaying to the user information conveying that the first user communication message has been received by the mobile communication device.

6. The network communication device of claim 5, further including:
logic for monitoring the presence of the mobile communication device in the communications network through a series of network information messages; and
logic for displaying to a user information indicating the current state of the mobile communications device in the communications network, wherein the current state is one of the group consisting of on-network and off-network; and
logic for displaying the new state of the mobile communication device, wherein the new state is displayed responsive to the state of the mobile communication device changing.

7. A system for providing information from a sender to a mobile communication device in a communications network, the system comprising:
a server in communication with a mobile communications network, wherein the server communicates with mobile communication devices in the mobile communications network using a first protocol, wherein the mobile communication devices are adapted to provide the communications network with one identifier for each mobile communication device in a group of mobile communication devices, wherein the server monitors the state of each mobile communication device, wherein the state of each mobile communications device is one of the group consisting of on-network and off-network, wherein responsive to the state of the mobile communication device changing, transmitting network information related to the change of state of the mobile communication device to the sender, and wherein the server is adapted to provide network state information for a group of mobile communication devices to a network communication device; and a network communication device in communications with the server, wherein the network communication device and the server communicate using a second protocol, and wherein the network communication device is adapted to provide a user interface for communicating user communication messages with the mobile communication devices and adapted to display network state information for the group of mobile communication devices, wherein prior to receiving a second user communication message from the communications network, displaying to a user information conveying that a first user communication message has not been received by the mobile communication device and responsive to receiving the second user communication message from the communications network, displaying to the user information conveying that the first user communication message has been received by the mobile communication device, wherein the network communication device is adapted to, before any user communication message is transmitted, delay the transmission of a user communication message intended for a specific mobile communication device until the specific mobile communication device is on-network in the mobile communications network.

8. The system of claim 7, further including:
a database having table associating the network communication device to the group of mobile communication devices.

9. The system of claim 7, wherein the second protocol is a protocol for electronic email carried over the internet, and the first protocol is a Short Message Service protocol.

* * * * *